Patented July 30, 1929.

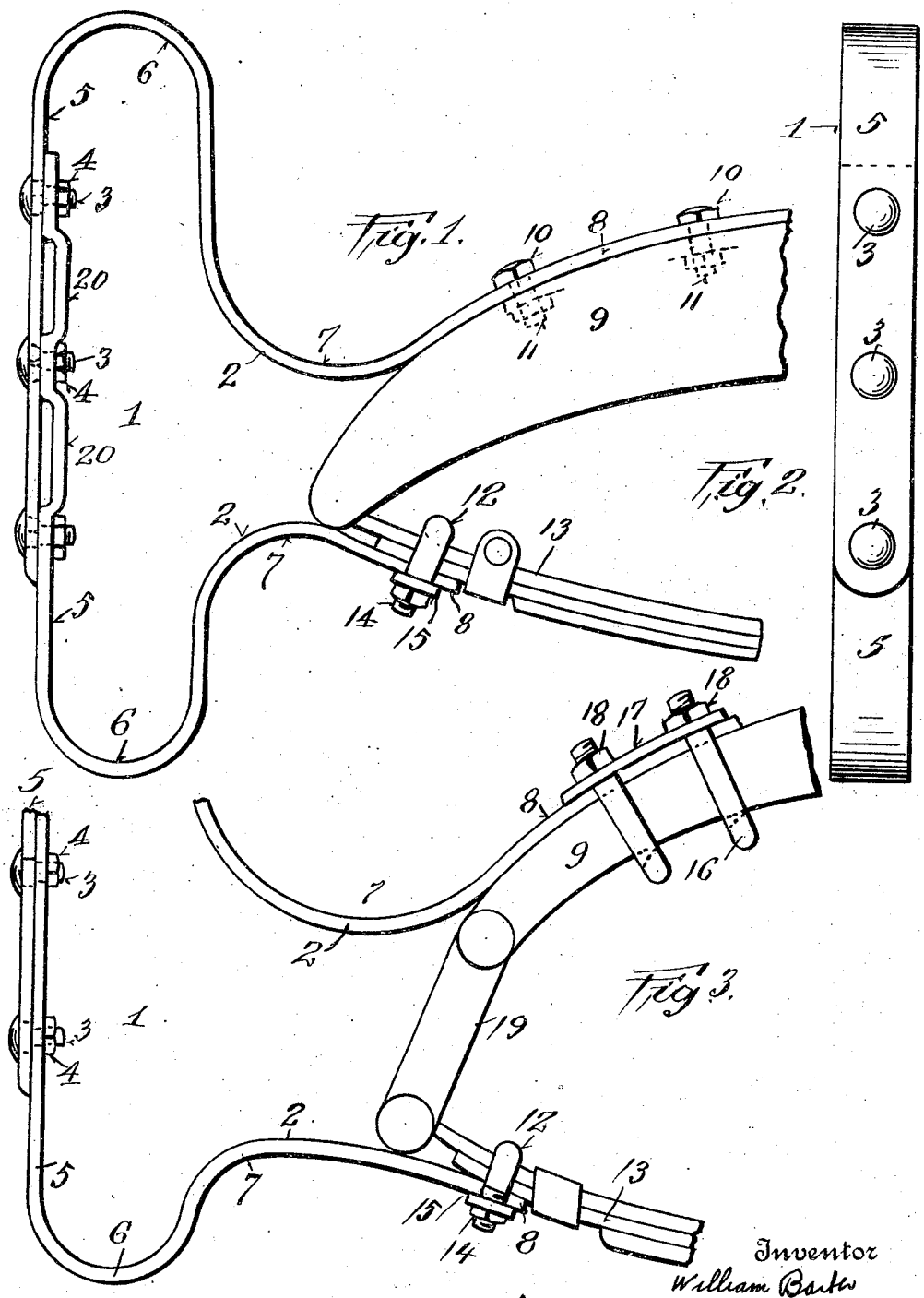

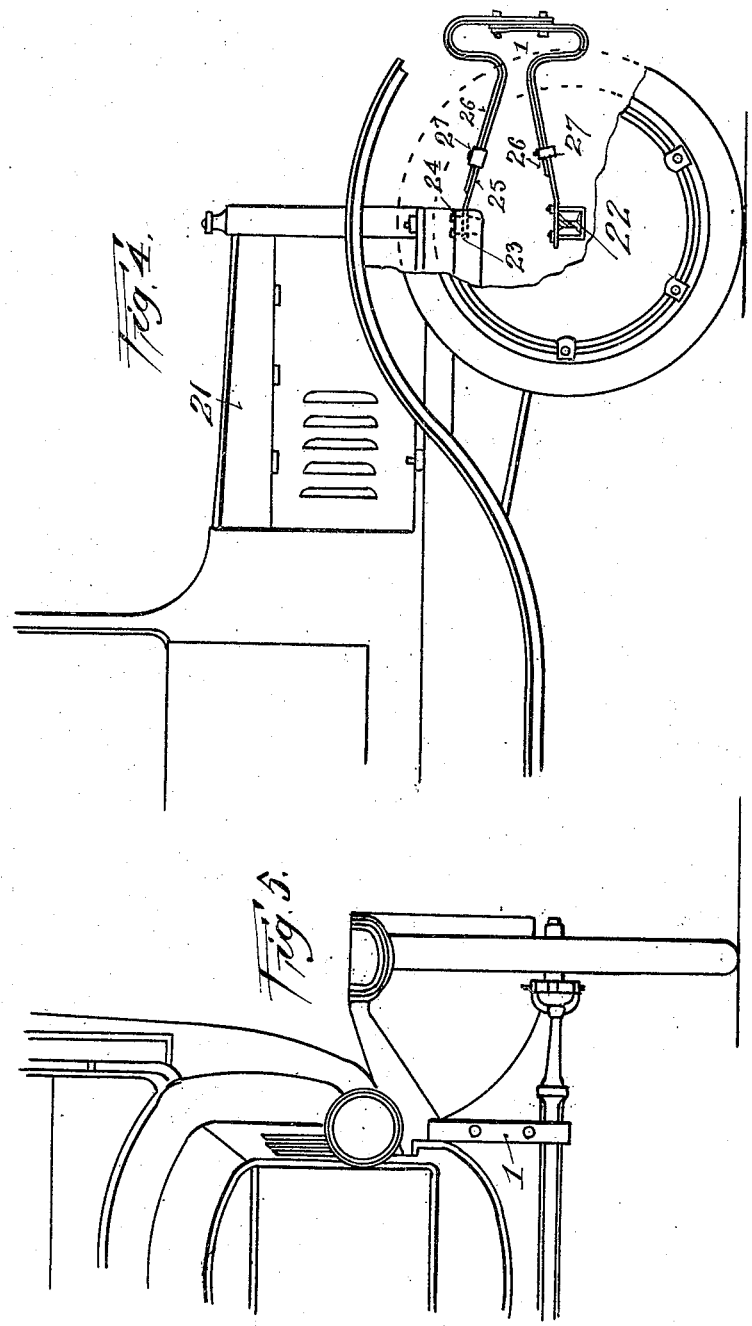

1,722,782

UNITED STATES PATENT OFFICE.

WILLIAM BARBER, OF BROOKLYN, NEW YORK.

SHOCK ABSORBER.

Application filed September 3, 1925. Serial No. 54,217.

The general object of this invention is to produce a shock absorber which is efficient in operation, cheap to make, and simple to install.

Another object is to supply a shock absorber upon which a buffer bar may be mounted if desired.

A further object of this invention is to provide a device which will take and absorb vertical shocks and jars due to the operation of a car over rough or uneven ground.

Other objects of the invention will appear more fully hereinafter.

The invention consists substantially in the construction, combination, location and relative arrangement of parts, all as will be more fully hereinafter set forth, as shown in the accompanying drawings, and finally pointed out in the appended claims.

Referring to the drawings:

Figure 1 is a view in side elevation of the rear end of an automobile chassis and a shock absorber applied thereto.

Figure 2 is an end elevation of the shock absorber looking in the direction of the car body.

Figure 3 is a view in side elevation of the rear end of an automobile chassis and a shock absorber applied thereto in a modified manner.

Figure 4 is a side elevation of the front end of an automobile with a shock absorber of slightly different construction applied thereto.

Figure 5 is a front elevation of a section of a car with a shock absorber applied thereto.

The same part is designated by the same numeral throughout the several views.

It is common in automobile practise to apply some form of shock absorber to the front or to both ends of the car. It is, therefore, my purpose to supply a new form of device which may quickly and easily be installed at a relatively low cost.

In carrying out my invention, I propose to construct the frame-work of the shock absorber of sheet steel stampings which possess the necessary resiliency to absorb the shocks and vibrations due to the car operation. It is also evident that these absorbers may serve as bumpers within a limited field of action.

The shock absorbing feature of the invention is secured by so connecting the frame of the device to the chassis or body of the machine and to the spring or axle, as to resist through the natural resiliency of the frame, relative movements of the running gear and chassis.

The natural resiliency of the frame may be varied by using different thicknesses of steel stampings or by making the frame of a number of leaves in a manner similar to the built up leaf spring so well known in the automobile industry.

In the accompanying drawings, I have shown various structures and arrangements illustrative of the principles of my invention, but it is to be understood that the invention may be carried into practise in many dfferent structures and arrangements. I do not desire, therefore, to be limited or restricted, in the broader scope of my invention, as defined in the claims, to the specific structures and arrangements shown and now to be described.

Referring to the drawings, the frame indicated in general as 1 consists of two curved spring members 2 bolted together by bolts 3 and nuts 4. Each half 2 of the frame is composed of a straight portion 5 running into a semi-circular curve 6 and back parallel to the portions 5, and then extending into the curved portion 7. The free ends 8 are then curved to overlie the chassis and springs respectively as shown in Figures 1 and 2.

The upper free end 8 is bolted to the chassis 9 by bolts 10 and nuts 11 (see Figure 1). The lower free end 8 is attached by means of a U-clamp 12 to the end of the leaf spring 13. Nuts 14 are screwed onto the free ends of the U-clamp 12 being forced down against the cross bar 15, thus securely binding the frame and spring together.

In Figure 2 is shown the shock absorber frame looking toward the car, and needs no explanation.

Figure 3 shows a slightly modified means for clamping the upper free ends of the frame to the chassis in the U-clamps 16 which extend through a plate 17 which is forced down against the free end 8 by means of nuts 18. The link 19 represents one of the recognized methods of attaching the chassis frame to the springs.

Referring again to Figure 1, I may provide if desired offset portions 20 in the lower frame member 5 in which bumper bars may be readily secured in the manner set forth in my copending application, Serial No. 454,397 filed March 22, 1921 which on December 29, 1925 issued as Patent No. 1,567,781.

Figure 4 illustrates more clearly how my invention appears in place on the front of an automobile indicated generally at 21. 1 is the shock absorber frame attached at 22 to the axle of the car by the usual U-clamp and nuts. The upper end is attached to the car frame at 23 by bolts 24 or it may be attached to an extension on the frame. The frame is shown in this view as made up of two leaves 25 and 26 and fastened by clips 27 in the manner as is usual in leaf spring construction. By using a suitable number of leaves it will be possible to give the shock absorber any desired strength and resiliency so that it may be used on very heavy trucks.

Figure 5 shows my invention applied to a machine as it would appear to one looking toward the radiator.

It will appear that by my invention I provide a shock absorber which will be an auxiliary to the usual springs of a car so that when the car is overloaded the excess force on the springs will be taken up and resisted.

While I have shown my invention embodied in certain physical forms, it will be understood that the principle and mode of operation of my device as disclosed herein may take many other forms, and therefore, I do not desire to be limited to my disclosed form.

What I claim as new and useful and desire to secure by Letters Patent is:

1. The combination with a vehicle having a frame, an axle, of a shock absorber for said vehicle, said shock absorber comprising a pair of spring members with overlapping parts secured together at one end and having at the other end arms secured to said vehicle frame and axle, respectively, and forming intermediate reverse loops.

2. The combination with a vehicle having a frame, an axle, of a shock absorber for said vehicle, said shock absorber comprising spring members having one end rigidly united and having the free ends secured to said vehicle frame and axle, respectively; said spring members having loops intermediate the rigidly united ends and their free ends.

3. A shock absorber comprising spring members united to form an intermediate part, said members having arms spaced apart for attachment to portions of a car spaced apart vertically and serving to take excess load and rebound.

4. The combination with a vehicle having an axle frame and spring, of a pair of shock absorbing members comprising each a bar bent to form a loop between the ends thereof, the portions of said bars at one side of each loop being arranged to overlap each other, the other ends of said portions being secured to said axle and frame respectively.

5. The combination with a vehicle having an axle frame and spring, of a pair of combined shock absorbers each of which comprises a bar bent to form a loop between the ends thereof, the portions of said bars at one side of each loop being arranged to overlap each other, means to secure said overlapped ends, and means to secure the free ends to said axle and frame, respectively.

6. In combination, a vehicle axle, a vehicle frame, a spring bar for supporting said frame on said axle, and a shock absorber interposed between the axle and the frame and projecting forwardly from said vehicle, said shock absorber comprising a pair of spring bars bent between their ends to form loops, the portions of said bars at one side of each loop being arranged to overlap each other, means for adjustably securing said overlapped portions together, and means for attaching the free ends to said axle and frame, respectively, said bars being arranged in spaced relation along said axle and at opposite sides of said frame.

In testimony whereof I have hereunto set my hand on this 21 day of August A. D., 1925.

WILLIAM BARBER.